United States Patent
Donley

(10) Patent No.: US 8,645,762 B2
(45) Date of Patent: Feb. 4, 2014

(54) QUEUE FREEZE ON PROTOCOL ERROR

(75) Inventor: Greggory D. Donley, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 617 days.

(21) Appl. No.: 12/963,086

(22) Filed: Dec. 8, 2010

(65) Prior Publication Data

US 2012/0151251 A1 Jun. 14, 2012

(51) Int. Cl.
*G06F 11/00* (2006.01)

(52) U.S. Cl.
USPC ............................ 714/38.11; 714/34; 717/128

(58) Field of Classification Search
None
See application file for complete search history.

(56) References Cited

U.S. PATENT DOCUMENTS

| | | | | |
|---|---|---|---|---|
| 4,620,302 A | * | 10/1986 | Binoeder et al. | 714/700 |
| 5,379,416 A | * | 1/1995 | Takishima | 714/45 |
| 5,444,859 A | * | 8/1995 | Baker et al. | 714/20 |
| 6,202,125 B1 | * | 3/2001 | Patterson et al. | 711/118 |
| 2002/0129300 A1 | * | 9/2002 | Floyd et al. | 714/39 |
| 2003/0163758 A1 | * | 8/2003 | Austen et al. | 714/8 |
| 2007/0186035 A1 | * | 8/2007 | Chiba | 711/108 |
| 2007/0220350 A1 | * | 9/2007 | Ogasawara et al. | 714/38 |
| 2008/0244328 A1 | * | 10/2008 | Bohizic et al. | 714/45 |
| 2011/0023052 A1 | * | 1/2011 | Huang et al. | 719/318 |

FOREIGN PATENT DOCUMENTS

JP 406161820 A * 6/1994 .............. G06F 11/28

* cited by examiner

*Primary Examiner* — Gabriel Chu
(74) *Attorney, Agent, or Firm* — Volpe and Koenig, P.C.

(57) ABSTRACT

A method and apparatus for retrieving a state of a processor at a time at which failure is detected. More specifically, the detection of one or more protocol errors results in the halting of operations of one or more system elements, and the retrieving of the state of the processor at the time of the failure.

15 Claims, 5 Drawing Sheets

QUEUE FREEZE ON PROTOCOL ERROR

FIELD OF THE DISCLOSURE

This application relates to a data cache in a semiconductor device (e.g., an integrated circuit (IC)).

BACKGROUND

Modern processors often contain multiple processing cores, multiple levels of cache hierarchy and complex interfaces between many different blocks of logic. Attempting to debug failures in this environment may be very difficult and time consuming. Often scan dumps, which provide an instantaneous view of the state of the processor, may provide some insight as to the cause of failure when one is detected. However, many times, the events that cause the failure actually occur much earlier than (prior to) the point at which the failure is detected and the state is captured. As a result, the processor state captured via scan at the time of detection contains little or no useful information regarding the cause of the failure.

SUMMARY OF EMBODIMENTS OF THE PRESENT INVENTION

A method and apparatus are presented for retrieving a state of a processor at a time at which failure is detected. More specifically, the detection of one or more protocol errors results in the halting of operations of one or more system elements, and the retrieving of the state of the processor at the time of the failure.

DETAILED DESCRIPTION OF THE EMBODIMENTS

Figure 1:
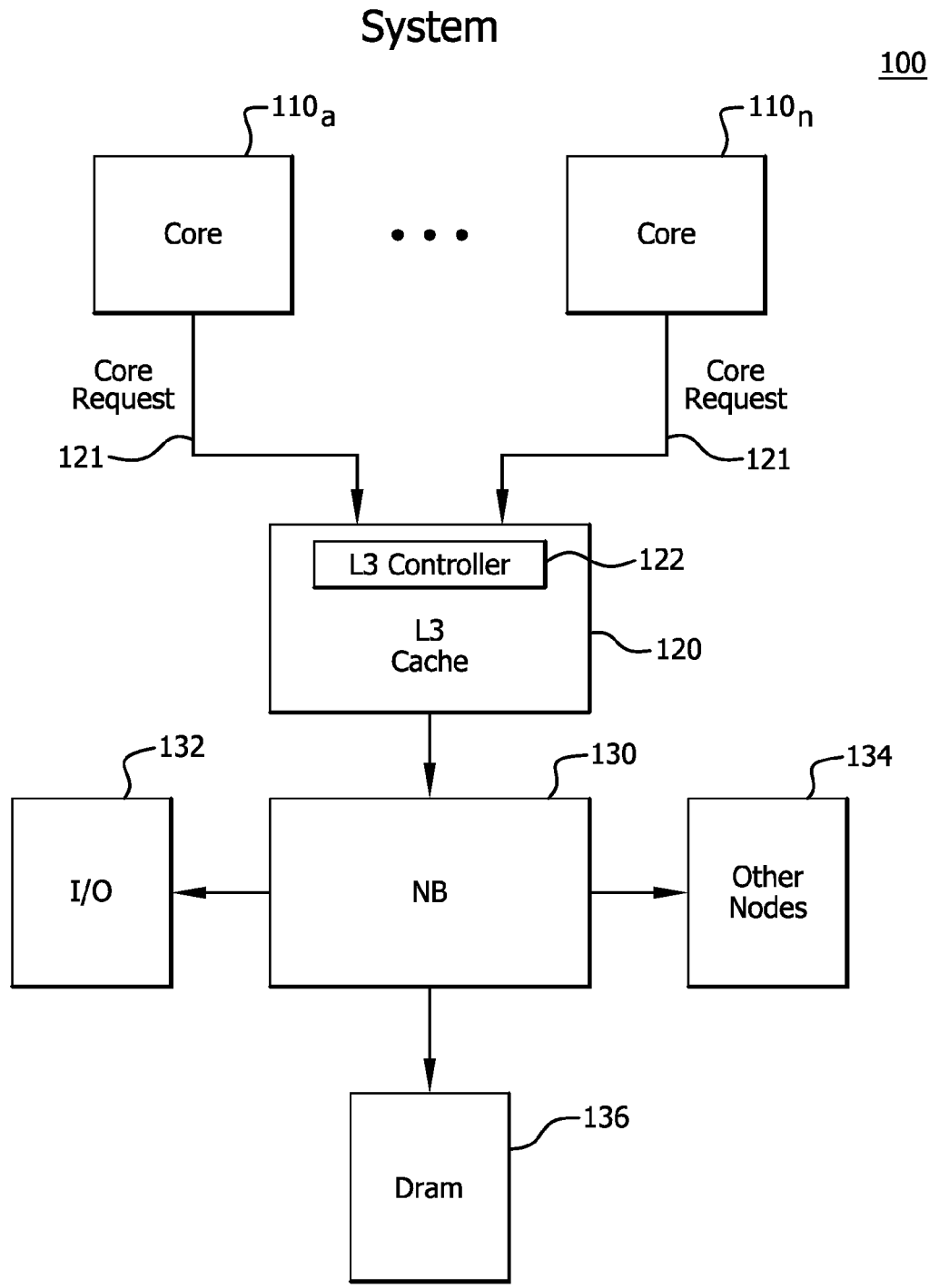
FIG. 1 shows an example of a multi-core processor configured to implement an embodiment of the invention.

While the examples herein describe specific types of caches (e.g., an L3 cache) and devices associated with caches (e.g., L3 controller), any type of cache and devices associated with caches, wherein there may be multiple caches operating at multiple levels for multiple purposes, may apply. The term "memory" as used herein, refers to any type of storage including but not limited to dynamic random access memory, flash memory, disk or the like.

In the process of debugging errors in processors, determining the root cause of an error is advantageous. Many errors cause a system to halt functioning. An interface known as a joint test action group (JTAG) is commonly used to provide access to debug information on a chip by enabling the scanning of the chip state. This is accomplished using register or storage elements, which are commonly known as "flops", "flip-flops" or "registers", which have additional inputs and outputs beyond those used for normal operations and which allow all or the vast majority of the flops in the chip to be connected together in long chains used for scanning or "scan chains". Via the JTAG interface, each of the scan chains in the chip may be shifted so that the state of each flop in the chain may be transferred to the next flop in the chain and eventually to the JTAG controller, which provides the sequence of flop states to an external analyzer. The JTAG controller and SCAN controller are similar in regards to their SCAN methodology.

Through either the JTAG controller or the SCAN controller, the scanning of the state of the chip (e.g., its current condition) at an instant in time is accomplished. Through the SCAN process, information may be retrieved from the chip that may lead to a determination of the error that caused the system to halt functioning. However, many times the instant in time at which the SCAN feature is used is much later than the time at which the actual error occurred. This delay in time causes important information regarding the cause of the malfunction or error to be lost. When the system runs for a time after the error occurs, the system state is changed and it is no longer possible to determine the cause of the error.

Certain error conditions, known as protocol errors, may occur in the system and may lead to a failure of the system. Protocol errors may occur in many different scenarios including but not limited to when inconsistencies are detected between transactions that are issued to a cache and the state of the data already in the cache and when a queue overflows. The condition of the system at the time the protocol error occurred may be lost by the time the system halts and the SCAN feature is used. By freezing or halting the state of a portion of the system at a time approximate to when a protocol error occurs, conditions present at the time of the protocol error may be preserved for analysis and used to debug the problem. Some of the conditions that may be preserved include but are not limited to transaction types, requests types, addresses, cache states, cache locations being addressed and addresses contained in queues.

Described below is a mechanism to preserve the state of a processor (e.g., a central processing unit (CPU)) at the time when the failure actually occurred.

FIG. 1 shows an example of a multi-core processor 100 configured to implement an embodiment of the invention. The processor 100 comprises multiple cores 110a-110n, wherein the cores 110a-110n are coupled to a cache (e.g., an L3 cache) 120. One or more core requests 121 from the multiple cores 110a-110n are received by a controller (e.g., an L3 controller) 122 via the L3 cache 120.

The L3 cache 120 is connected to non-processor related resources (e.g., North Bridge (NB)) 130. The non-processor related resources 130 provide connectivity to dynamic random access memory (DRAM) memory 136, input/output (I/O) devices 132 and other nodes 134.

Figure 2:
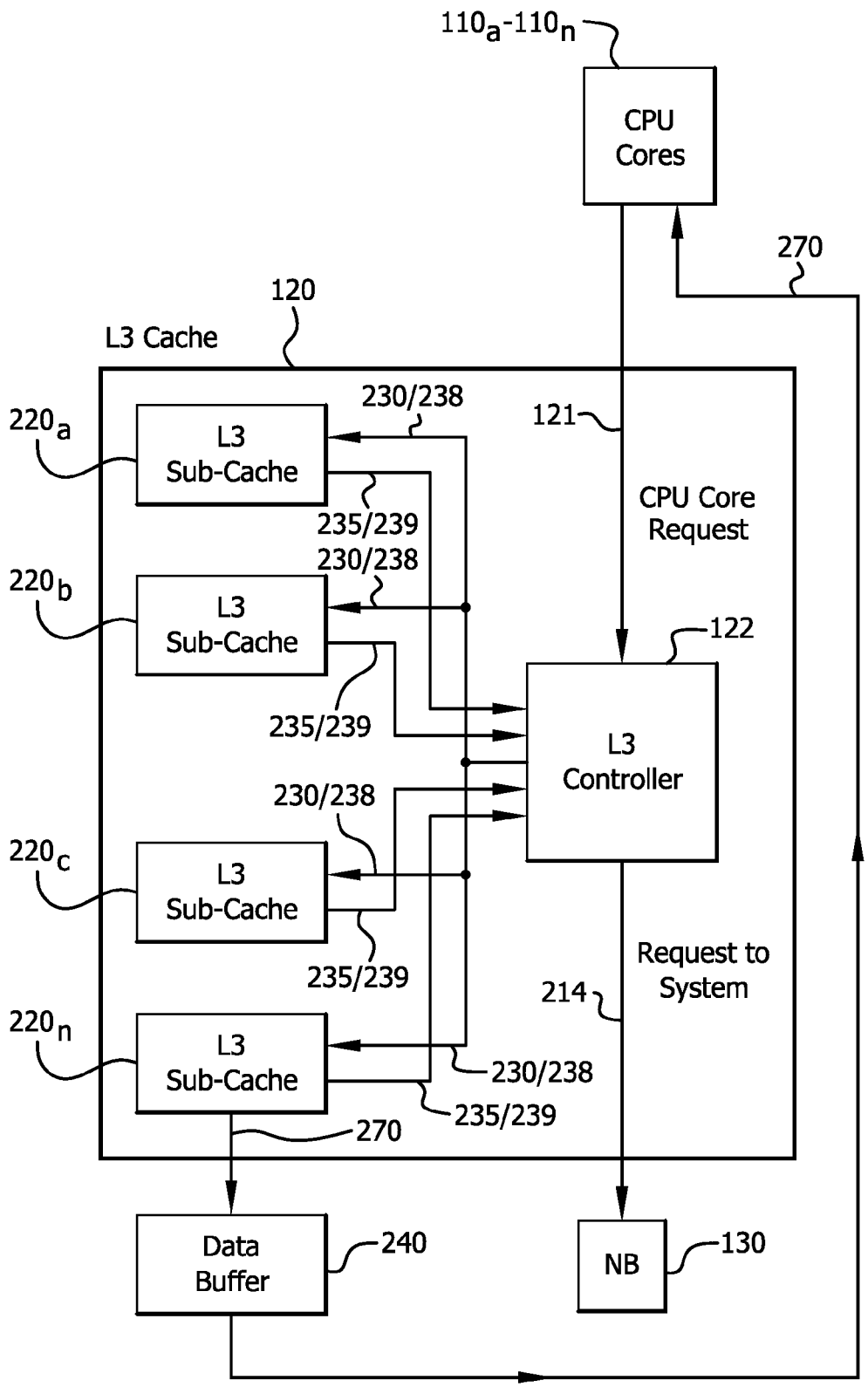
FIG. 2 shows an example of a level three (L3) cache of the processor of FIG. 1.

FIG. 2 shows an example of the L3 cache 120 of the processor 100 in FIG. 1. The L3 cache 120 includes a controller (e.g., an L3 controller) 122 which is coupled to multiple sub-cache's 220a-220n.

The L3 controller 122 receives core requests 121 from the multiple cores 110a-110n and tries to complete the core requests 121 by sending tag requests 230 to the sub-caches 220a-220n. These sub-caches 220a-220n are used to store addresses of data and the associated data, and return a tag response 235, which includes the location of the data to the L3 controller 122. If the tag response 235 indicates that the requested data is stored in the sub-caches 220a-220n (e.g., a "tag hit"), the L3 controller 122 sends a data request 238 to the sub-caches 220a-220n to retrieve the requested data. The sub-caches 220a-220n respond by sending a data response 239 to the L3 controller 122 and sending the accessed data 270 to the data buffer 240. The data may then be provided to the cores 110a-110n by the data buffer 240.

The L3 controller 122 transmits core requests 214 to the non-processor related resources 130 (FIG. 1), if the L3 controller 122 is unable to satisfy the core requests. These core requests may target resources on the same node (e.g., local DRAM), some may target resources on other nodes (e.g., I/O or DRAM), and some may target I/O connected to the local node. A resource is targeted based on address and request type.

Figure 3:
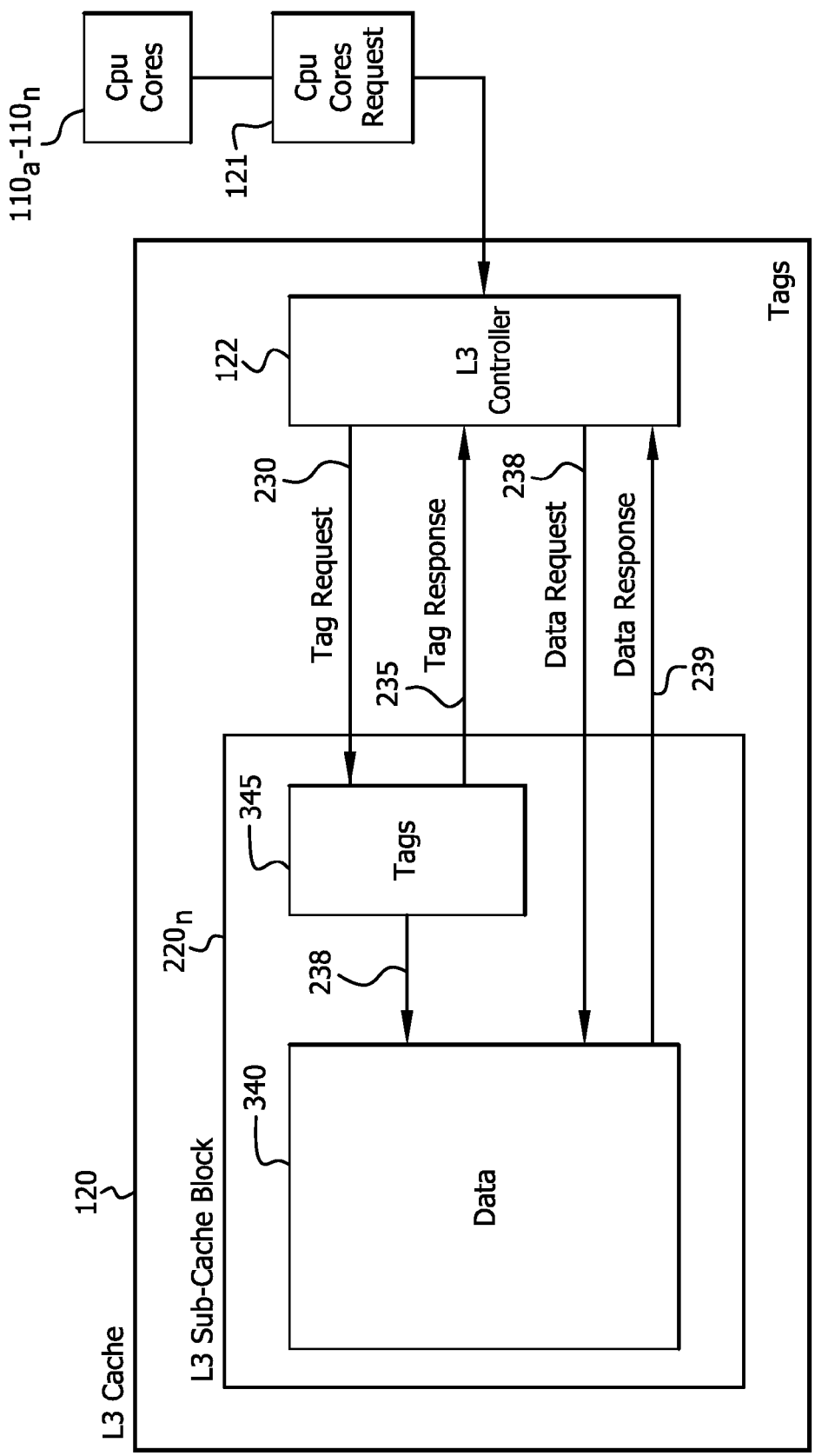
FIG. 3 shows an example of the L3 sub-cache of FIG. 2.

FIG. 3 is an example of a more detailed view of the L3 sub-caches 220a-220n. The L3 sub-cache 220n stores addresses of data in a tag array 345 and the associated data in a data array 340. The L3 sub-cache 220n receives core requests 121 from the multiple processor cores 110a-110n (e.g., CPU cores) via the L3 controller 122.

Once the L3 controller 122 receives core requests 121 from the multiple processor cores 110a-110n, it processes the core requests 121 by sending tag requests 230 and data requests 238 to the sub-caches 220a-220n (these requests are shown in FIG. 3, only with respect to L3 sub-cache 220n). Tag requests 230 contain the address, request type and an implicit enable condition, which indicates whether a tag request 230 may be converted to a data request 238 in a sub-cache. If the implicit enable feature is activated for a particular tag request 230, on the condition that a "tag hit" occurs, the tag request 230 is converted to a data request 238. A tag hit occurs when the requested data line is stored in the data cache 340. A "tag miss" occurs when the requested data line is not stored in the data cache 340.

An implicit enable condition may be turned either on or off for a particular tag request 230. If the implicit enable condition is turned on and a tag hit occurs, the tag request is automatically converted to a data request. If the implicit enable condition is turned off and a tag hit occurs, the L3 controller 122 generates an "explicit" data request 238 to receive data upon receipt of a tag response 235.

An explicit request requires the L3 controller 122 to send a data request 238 to sub-caches 220a-220n (FIG. 1) in order to access requested data by performing an explicit data read. An implicit request enables requested data to be accessed immediately without delay by performing an implicit data read. If the request is read and if the data is present in any state, the request may be satisfied. If the request is a read-for-ownership (e.g., a request to modify the data) the state of the data must be either "Exclusive", where no other processor holds a copy, or "Modified", where the data may be modified at will.

State information may be returned in the tag response 235. Based on the state information the controller may determine if the data is in an appropriate state for the type of request attempted. The tag response 235 may also contain information regarding which core first placed the line in the cache as well as LRU (least-recently-used information). In addition, if the tag request 230 is an "allocate" request (e.g., a request to insert a new line in the cache) the tag response 235 may contain the new line's address information.

A tag response 235 is transmitted by the L3 sub-caches 220a-220n (FIG. 1) to the multiple cores 110a-110n via the L3 controller 122. A data response 239, which includes information corresponding to the data request, is transmitted by the L3 sub-caches 220a-220n (FIG. 1) to the multiple cores 110a-110n via the L3 controller 122. The data response 239 provides an indicator to the cores 110a-110n of the type of state it may store in a line in its cache. The "response state" is a function of the L3 controller 122 state, the request type and the original allocating core (e.g., whether it is different than the requesting core). In addition, error status is provided in the data response 239 when there is an error in reading the data.

Figure 4:
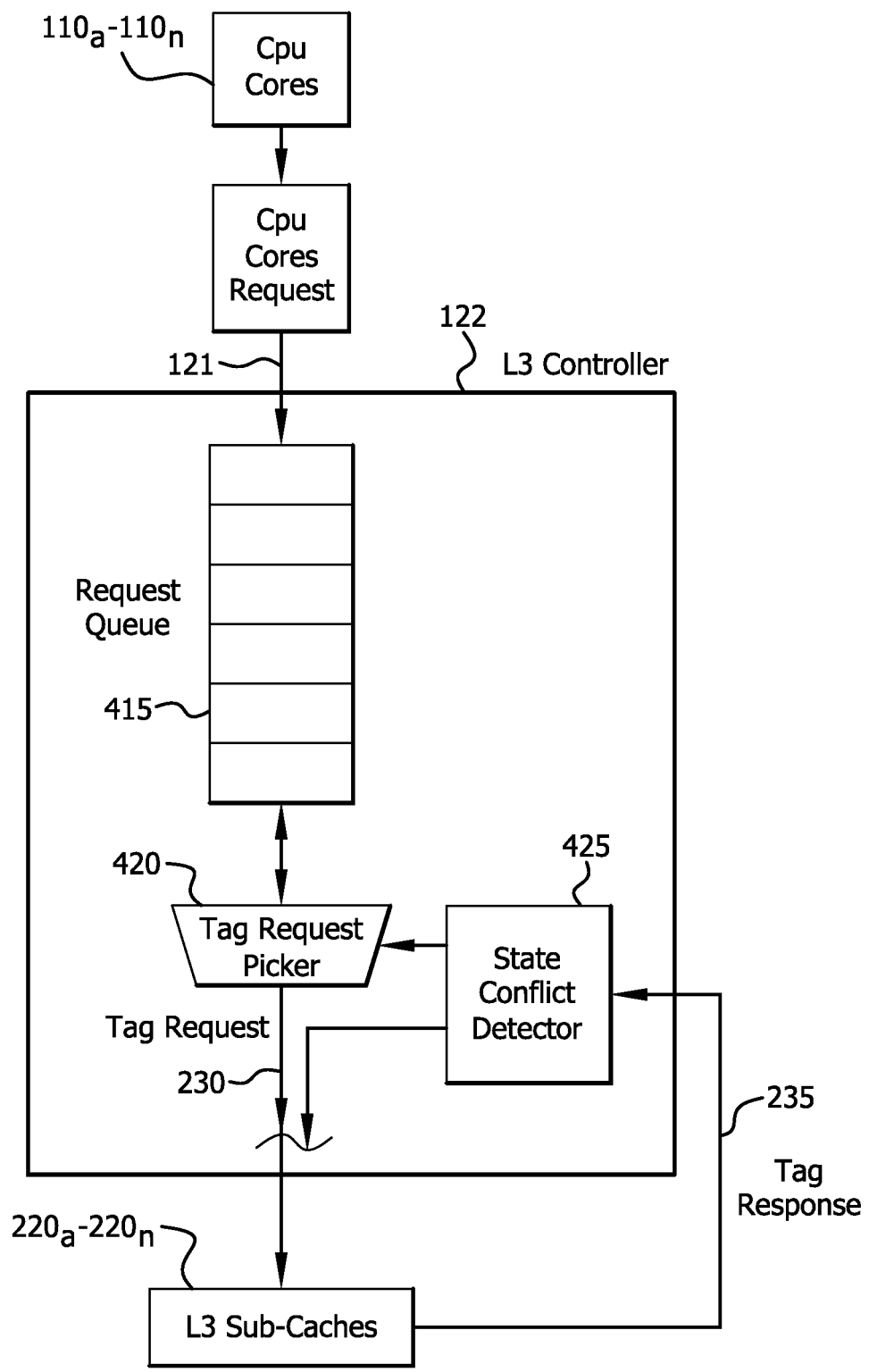
FIG. 4 shows a high level diagram of an L3 controller shown in FIGS. 2 and 3.

FIG. 4 shows a high level diagram of the L3 controller 122 of FIGS. 2 and 3. A request queue 415 within the L3 controller 122 receives core requests 121. The core requests 121 are placed in the request queue 415 until they can be serviced by the tag request picker 420. Tag request picker 420 selects tag requests 230 from the request queue 415 and transmits the tag requests 230 to tag array 345 (FIG. 3) in the sub-caches 220a-220n.

A state conflict detector 425 receives tag responses 235 from the tag array 345 in the sub-caches 220a-220n. These tag responses 235 indicate the address of a particular cached line within the tag array 345. In addition, the tag response 235 indicates a state of a particular cached line within the tag array 345. The state of a particular cached line may include but is not limited to whether the line is present in the tag array 345, whether the line has been modified, which core allocated the line, whether the line is shared between multiple processing elements, or whether the L3 cache can service the request or if the request may be forwarded to other areas.

The state conflict detector 425 may be able to inhibit the tag request picker 420 from servicing core requests 121 once a protocol error is detected. When a protocol error is detected, a protocol error signal may be generated by the state conflict detector 425. Protocol errors may occur under certain general circumstances in instances including, but not limited to, when something unexpected is received in the tag response 235, when an unexpected condition is detected by the state conflict detector 425, or when a condition is contrary or in conflict with other conditions in a chip. More specifically, protocol errors may include but are not limited to instances where: 1) multiple hits are detected in the sub-cache 220a-220n by a tag request 230, when the sub-cache may only contain a single copy of each address/line; 2) multiple hits are detected in the sub-cache 220a-220n by a tag probe, when probe requests are generated via another port to the tag array; 3) the request queue overflows, which is an attempt to load a new entry when the request queue is full; 4) a request is received attempting to allocate modified data in a sub-cache when the line in the sub-cache is already present; and 5) a request is received attempting to allocate non-modified data into the sub-cache when the line is already present with modified data.

Figure 5:
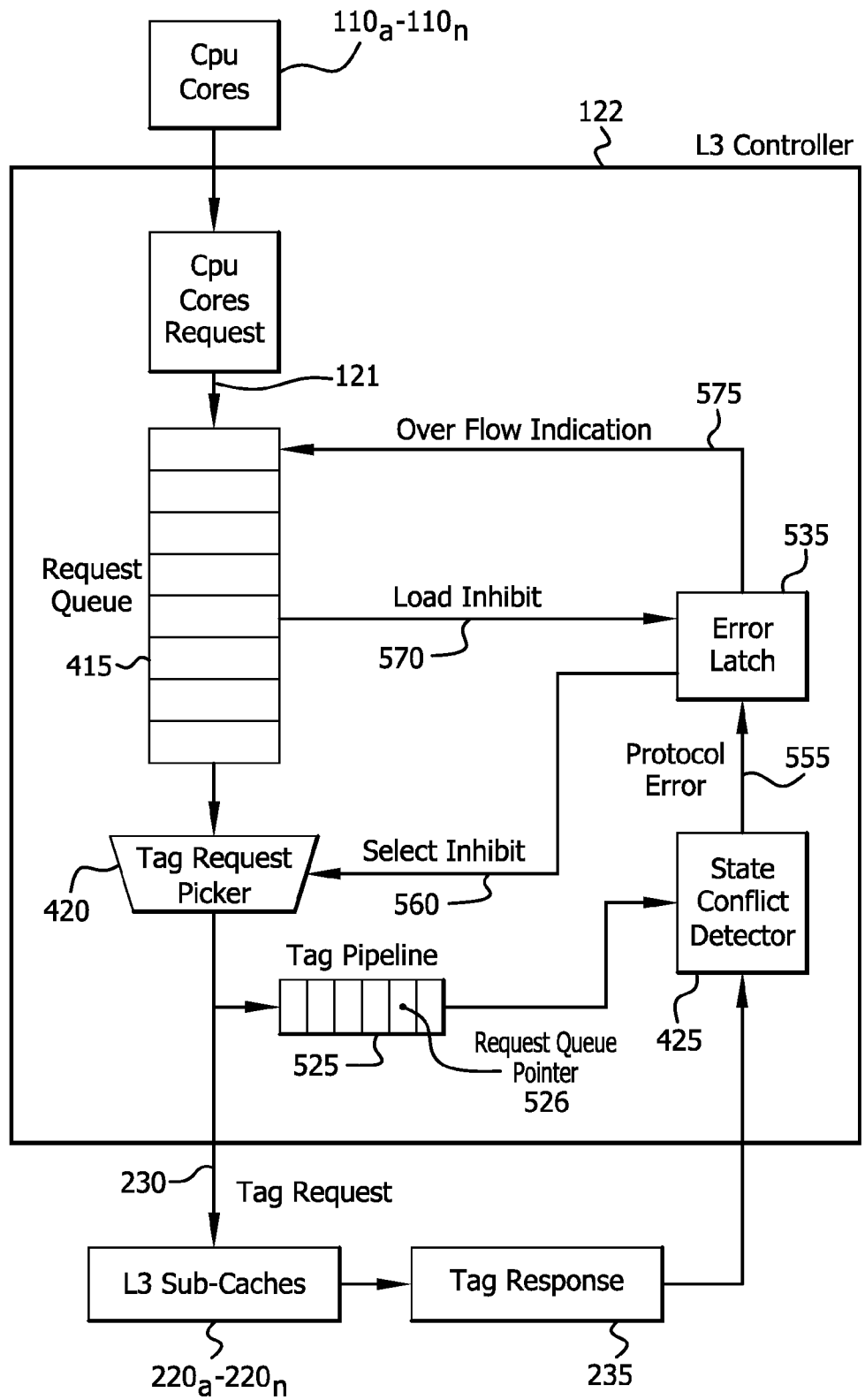
FIG. 5 shows a detailed diagram of the L3 controller shown in FIGS. 2 and 3.

FIG. 5 is a detailed diagram of the L3 controller 122 of FIGS. 2 and 3. The L3 controller receives core requests 121 from the multiple cores 110a-110n. Core requests 121 are placed in the request queue 415 until they are able to be serviced by the tag request picker 420. There may be several requests in the request queue 415 that are waiting to be picked by the tag request picker 420. A tag request 230 is a request to look for a particular address in the L3 cache and is generated based on information in the core request 215. The tag request picker 420 selects the tag requests 230 from the request queue 415 and transmits the tag requests 230 to the tag array 345 in the sub-caches 220a-220n.

Once the tag request 230 is selected, the corresponding core request 215 is passed through a tag pipeline 525. There are several types of core requests that are sent to the tag pipeline 525 including but not limited to lookup, allocate, compare and write. Lookup and allocate core requests may generate a protocol error, in addition to the protocol errors noted above, since both of these requests perform a tag compare operation in the sub-caches 220a-220n, and when the state of the line in a sub-cache 220a-220n is inconsistent with the allocation or lookup request, a protocol error may be generated. In addition, cache coherency protocols might include different types of errors that are detectable and may be considered protocol errors.

The tag pipeline 525 preserves the core request 215. Also, the tag pipeline 525 tracks the time that it takes a sub-cache to generate a tag response 230 so that the tag response 230 may be associated with the core request 215. A request queue pointer 526 within the tag pipeline 525 is associated with the tag request 230. The request queue pointer 526 may retrieve from the request queue 415 the request type and the address of the tag request 230.

A tag response 235 is received from a sub-cache 220a-220n by the state conflict detector 425. Both the tag response 235 and the core request 215 are sent to the state conflict detector 425, to determine if the tag response 235 is a valid response based on the core request 215. If the tag response 235 is not valid, which indicates a protocol error has occurred, the state conflict detector 425 generates a protocol error signal 555. A protocol error signal 555 may be generated based on any type of protocol error detected by the state conflict detector 425. When the state conflict detector 425 detects a protocol error, a protocol error signal 555 is sent to an error latch 535. The error latch 535 receives the protocol error signal 555 from the state conflict detector 425 and also receive other types of errors, including overflow indications 425, from the request queue 415.

The error latch 535 generates one or more signals, which are distributed to other elements within the L3 controller 122 to inhibit at least some of the processor operations, upon the receipt of the protocol error signal 555. A select inhibit signal 560 is generated by the error latch block 535 and may be sent to the tag request picker 420. The select inhibit signal 560 prevents the tag request picker 420 from generating any further tag requests 230 once a protocol error is detected.

A load inhibit signal 575 may also be generated by the error latch block 535 upon the receipt of the protocol error signal 555, and may be sent to the request queue 415. Load inhibit signal 575 prevents the request queue 415 from accepting any more core requests 215. By preventing the request queue 415 from accepting core requests 540, the state of the request queue 415 is preserved from the point when the load inhibit signal is received 575.

The request queue 415 may continue to operate even after an error is detected unless the request queue 415 receives the load inhibit signal 575 and halts the acceptance of core requests 215. By halting or freezing the acceptance of core requests 215 the request queue 415 is not only prevented from accepting further core requests 215 it is also prevented from sending the core requests 215 to the tag request picker 420. Once the request queue 415 stops functioning the L3 controller 122 and in turn the L3 cache 120 (FIG. 2) are halted.

With the L3 cache 120 halted all queues and state machines servicing the L3 cache 120 may wait indefinitely for further instructions. As a result, the queues and state machines may all be halted and may all wait for a response to their requests, effectively preserving their state (e.g., current condition) so that they may not be altered.

With the L3 cache 120 halted so that no additional updates are made to the elements of the L3 cache 120, the elements retain their state at the time of the protocol error. The state of the elements in the L3 cache 120 are stored in memory flip flops, or storage elements within a processor. A SCAN feature in the processor may then be activated to preserve the state of the elements at the time the error occurred. The state information of the elements, once accessed, may provide information regarding the cause of the protocol error at approximately the time of the error. This information may be analyzed in order to debug the system.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a graphics processor, a CPU, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for halting operations of a cache in a processor when a protocol error is detected, the method comprising;
    sending a tag request for processing based on information in a request from a processor core;
    receiving a response to the tag request;
    detecting one or more protocol errors in the response, the one or more protocol errors include a request to allocate modified data or non-modified data; and
    halting operation of one or more elements in the cache based on the detection of the one or more protocol errors.

2. The method of claim 1 wherein the one or more elements include at least one of a local queue and a state machine.

3. The method of claim 1 wherein the one or more elements include the request from the processor core.

4. The method of claim 1 wherein the cache is a sub-cache, and the one or more protocol errors include at least one error regarding multiple hits detected in a sub-cache.

5. The method of claim 1 wherein the one or more protocol errors include a request queue overflow indication.

6. The method of claim 1 wherein the tag request includes an address of a requested line of data.

7. A data cache comprising:
    a controller configured to receive one or more requests from one or more processor cores, send one or more tag requests based on the one or more requests and receive a response based on the one or more requests, wherein the response includes one or more protocol errors, the one or more protocol errors include a request to allocate modified data or non-modified data; and
    a plurality of sub-caches configured to receive the one or more tag requests and in response to the one or more tag requests send a tag response.

8. The data cache of claim 7 wherein the controller is further configured to detect protocol errors in the response and on a condition that protocol errors are detected, generate a protocol error signal to halt operation of elements in the data cache.

9. The data cache of claim 7 wherein the one or more protocol errors include multiple hits detected in a sub-cache.

10. The data cache of claim 7 wherein the one or more protocol errors include a request queue overflow indication.

11. The data cache of claim 7 wherein the tag request includes an address of a requested line of data.

12. A method for retrieving state information when a protocol error is detected with respect to a cache of a processor, the method comprising:
  detecting protocol errors in a tag response, the protocol errors include a request to allocate modified data or non-modified data; and
  storing state information for one or more elements in the cache responsive to detection of the protocol errors.

13. The method of claim 10 wherein the one or more protocol errors include multiple hits detected in a sub-cache.

14. The method of claim 10 wherein the one or more protocol errors include a request queue overflow indication.

15. The method of claim 12 further comprising:
  scanning the cache to preserve the state information for the one or more elements;
  analyzing the state information; and
  debugging based on the state information.

* * * * *